US012353800B2

(12) United States Patent
Jost et al.

(10) Patent No.: US 12,353,800 B2
(45) Date of Patent: Jul. 8, 2025

(54) PARTING LINE IDENTIFICATION

(71) Applicant: Dassault Systemes SolidWorks Corporation, Waltham, MA (US)

(72) Inventors: Robert Jost, Waltham, MA (US); Yunching Huang, Superior, CO (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 928 days.

(21) Appl. No.: 17/350,077

(22) Filed: Jun. 17, 2021

(65) Prior Publication Data
US 2022/0405433 A1   Dec. 22, 2022

(51) Int. Cl.
 *G06F 30/12* (2020.01)
 *G06F 30/17* (2020.01)
 *G06F 113/22* (2020.01)

(52) U.S. Cl.
 CPC .............. *G06F 30/12* (2020.01); *G06F 30/17* (2020.01); *G06F 2113/22* (2020.01)

(58) Field of Classification Search
 CPC ...... G06F 30/12; G06F 30/17; G06F 2113/22; G06F 30/00; G06F 30/18; G06F 2111/00; G06F 2119/22
 See application file for complete search history.

(56) References Cited

U.S. PATENT DOCUMENTS

| | | | |
|---|---|---|---|
| 2002/0032552 A1* | 3/2002 | Nishiyama | G16Z 99/00 703/6 |
| 2005/0068329 A1* | 3/2005 | Hanau | G06T 15/04 345/589 |
| 2005/0154481 A1* | 7/2005 | Berger | B33Y 50/00 700/98 |
| 2020/0134106 A1* | 4/2020 | Suomi | G06F 30/20 |

OTHER PUBLICATIONS

M. M. Yusof, M. S. A. Mansor, "Alternative method to determine parting direction automatically for generating core and cavity of two-plate mold using B-rep of visibility map", pp. 3109-3126, (Year: 2018).*
Dassault Systemes: "Molded Parts Concepts", 2021 user manuals for CATIA, 2021.
Dassault Systemes: "Parting Lines", 2021 user manuals for SolidWorks, 2021.

* cited by examiner

*Primary Examiner* — Kibrom K Gebresilassie
(74) *Attorney, Agent, or Firm* — Sheehan Phinney Bass & Green PA

(57) ABSTRACT

A computer-based method is disclosed for identifying a parting line for molding a real-world part based on computer model of the part. The method includes receiving a computer-based representation of a modeled part and a parting direction for the mold to make a real-world version of the part. Then a computer-based processor characterizes each respective one of a plurality of faces in the computer-based representation of the modeled part as a positive draft face or a negative draft face. The method includes identifying, as at least a segment of the parting line, a boundary edge between a first one of the positive draft faces and a first one of the negative draft faces that neighbors the first one of the positive draft faces.

12 Claims, 12 Drawing Sheets

PARTING LINE IDENTIFICATION

FIELD OF THE INVENTION

This disclosure relates to the field of design (e.g., computer-facilitated design) and, more particularly, relates to a system and method for identifying a parting line for molding a real-world part based on a computer-based part design.

BACKGROUND

Various computer-aided design (CAD) programs exist that can be used to design plastic parts that will need to be molded to be manufactured. Manufacturability should be considered during the design of such parts. There is a need to facilitate such consideration, for example, by helping designers identify appropriate parting line locations for molds of such parts.

SUMMARY OF THE INVENTION

In one aspect, a computer-based method is disclosed for identifying a parting line for molding a real-world part based on computer-generated model of a part. The method includes receiving a computer-based representation of a modeled part and an indication of a parting direction for a mold to make a real-world version of the part. Then, a computer-based processor characterizes each respective one of multiple faces in the computer-based representation of the modeled part as a positive draft face or a negative draft face. Each positive draft face has positive draft with respect to the parting direction across its entirety and each negative draft face has negative draft with respect to the parting direction across its entirety. The method further includes identifying, as the parting line (or at least a segment thereof), a boundary edge between a first one of the positive draft faces and a first one of the negative draft faces that neighbors the first one of the positive draft faces.

A computer-based system is disclosed for identifying a parting line for molding a real-world part based on computer-generated model of a part. The computer-based system has one or more computer processing devices and computer-based memory operatively coupled to the one or more processing devices. The computer-based memory stores computer-readable instructions that, when executed by the one or more processors, cause the computer-based system to receive a computer-based representation of a modeled part and receive an indication of a parting direction for a mold to make a real-world version of the part. The computer-readable instructions, when executed by the one or more processors, further cause the computer-based system to characterize, with the one or more computer processing devices, each respective one of a plurality of faces in the computer-based representation of the modeled part as a positive draft face or a negative draft face. Each positive draft face has positive draft with respect to the parting direction across its entirety, and each negative draft face has negative draft with respect to the parting direction across its entirety. The computer-readable instructions, when executed by the one or more processors, further cause the computer-based system to identify, as at least a segment of the parting line, a boundary edge between a first one of the positive draft faces and a first one of the negative draft faces that neighbors the first one of the positive draft faces.

A non-transitory computer readable medium is disclosed that has stored thereon computer-readable instructions that, when executed by a computer-based processor, cause the computer-based processor to receive a computer-based representation of a modeled part and an indication of a parting direction for a mold to make a real-world version of the part. The computer-readable instructions further cause the computer-based processor to characterize each respective one of a plurality of faces in the computer-based representation of the modeled part as a positive draft face or a negative draft face. Each positive draft face has positive draft with respect to the parting direction across its entirety. Each negative draft face has negative draft with respect to the parting direction across its entirety. The computer-readable instructions further cause the computer-based processor to identify, as at least a segment of the parting line, a boundary edge between a first one of the positive draft faces and a first one of the negative draft faces that neighbors the first one of the positive draft faces.

In some implementations, one or more of the following advantages are present.

For example, in various implementations, the systems and techniques disclosed herein facilitates the easy and accurate identification of a parting line location for a modeled part that is to be molded. These systems and techniques apply broadly to at least injection mold making for plastic parts or components, and injection plastic product design.

In general, in order to create a CAD model of a mold, the user needs to create a series of features in succession, and those features generally rely on the parting line. The systems and techniques disclosed herein facilitate those steps.

Without implementations of the systems and techniques disclosed herein, defining parting lines for use downstream in a computer-aided design (CAD) system (and beyond) can be very time consuming. In order for a part to be molded successfully, the faces along the parting line need to be drafted (angled) in a specific way to allow the part to escape the mold. For complex shapes, the user would have had to select many edges, ensuring that these selections are where the draft angles for each side meet. Moreover, if a model face is shaped such that it lies on both sides of the parting line, its precise position across that face can be ambiguous without implementations of the systems and techniques disclosed herein. For such faces, the user would have needed to modify them (split them) in order to create an edge that the parting line can reference.

For most injection molded products, the final part will show defects along the parting line due to the material properties of plastics, so designers may spend a lot of time altering a design, so the parting line is in a specific position on the model. These challenges can be overcome or at least minimized with various implementation of the systems and techniques disclosed herein.

Additionally, various implementations of the systems and techniques disclosed herein solves the following technical problems: 1) identifying where on a given model, with a given pulling direction defined, is the optimum parting line based on the angle of the model's faces, 2) once the optimum parting line is determined for the user, avoiding the need for the user to make all the edge selections, which can be cumbersome and prone to mistakes, 3) for faces that lie on both sides of the parting line ("straddle faces"), the user can now avoid having to manually split these faces in order to create an edge through them, and 4) preventing invalid selections during parting line identification.

In a typical implementation, the systems and techniques disclosed herein can usually collect most necessary parting line edges without user intervention.

In various implementations, the systems and techniques disclosed herein facilitate speed and discovery. In certain implementations, the systems and techniques immediately show the user what the parting line should be, and then go ahead and make all the necessary selections to define it on the model. In the case of straddle faces, in certain implementations, the systems and techniques temporarily split the straddle faces at silhouette edges for the user so that the parting line definition is possible on faces that do not meet the requirement. This prevents the user from having to do this manually. In some implementations, the unnecessary loops option makes it clear to the user that certain selections might be invalid and prevents a lengthy "back and forth" with downstream features to open the mold. All of this leads to a very fast and efficient way to establish a correct parting line on a model.

Other features and advantages will be apparent from the description and drawings, and from the claims.

BRIEF DESCRIPTION OF THE DRAWINGS

Like reference characters refer to like elements.

DETAILED DESCRIPTION

Figure 1:
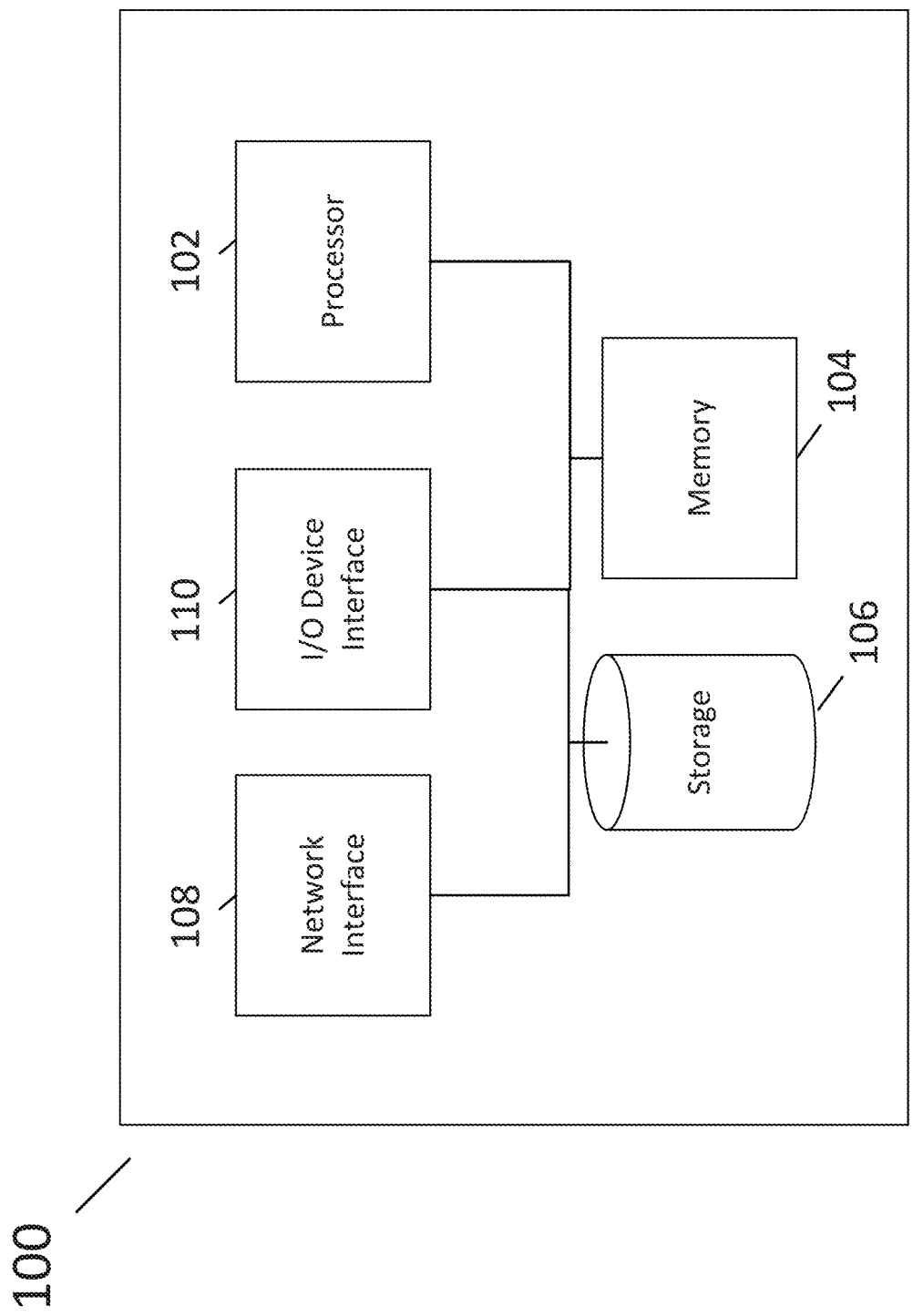
FIG. 1 is a schematic representation of an exemplary computer-based system that facilitates collaborative design processes for parts and/or molds for the parts including parting line identification functionalities.

This document uses a variety of terminology to describe its inventive concepts. Unless otherwise indicated, the following terminology, and variations thereof, should be understood as having meanings that are consistent with what follows.

For example, unless otherwise indicated, the phrase "molding" refers to a process of manufacturing by shaping a liquid or pliable raw material, such as plastic, glass, metal, ceramic, etc. using a rigid frame/hollowed-out block called a mold.

Unless otherwise indicated, the phrase "mold" refers to a rigid frame/hollowed-out block that can be filled with and shape a liquid or pliable raw material. The liquid is allowed to harden or set inside the mold, adopting its shape. Typically, molds have a core and a cavity that come together, along a parting line, and form an internal molding compartment. The core and cavity can be separated, at the parting line, to release a finished molded part. In some instances, the mold may include other parts as well.

Unless otherwise indicated, a "parting line" is where the two main mold pieces (e.g., the core and the cavity) meet when a part is being molded. Typically, the pieces meet at the parting line to define an internal mold cavity for forming a molded part, and then separate at the parting line allowing the molded part to be extracted from the internal mold cavity. A "parting line" is a characteristic of the mold itself. However, its location may be visually represented (e.g., as a line or line segments) on a virtual, computer-based model of the part or on a virtual model of the mold for the part. The term "parting line" is used throughout this document to refer to the actual parting line itself (on the mold) and/or the visible appearance or location of a parting line in a computer-based model.

Unless otherwise indicated, the phrase "pull direction" refers to a direction in which the cavity, for example, will be pulled (or will need to be pulled) relative to the core in order to separate the cavity from the core so as to open a mold.

Unless otherwise indicated, the phrase "draft" refers to a taper or curve given to a surface of a molded part (or to a surface of a mold) to help ensure that the part can be removed from the mold after molding. Draft may be quantified at a particular point on the surface of a molded part, for example, as an angle (the "draft angle") between an imaginary line that is normal to the surface of the part at that particular point and a plane that is perpendicular to the pull direction. Of course, draft may be quantified in other ways, such as by specifying a ratio of rise to run of the imaginary line relative to the plane that is perpendicular to the pull direction (e.g., in millimeters per millimeter or inches per inch, etc.)

Unless otherwise indicated, the phrase "positive draft" refers to a condition whereby, at a particular point along a surface, the draft angle is positive (e.g., greater than zero degrees).

Unless otherwise indicated, the phrase "negative draft" refers to a condition whereby, at a particular point along a surface, the draft angle is negative (e.g., less than zero degrees).

Unless otherwise indicated, the phrase "face" refers to a selectable area (planar or otherwise) of a model or surface of a part to be molded with boundaries that help define the shape of the model or surface. For example, a rectangular solid has six faces, and a cylindrical solid has three faces.

Unless otherwise indicated, the phrase "positive face" or "positive draft face" or the like refers to a face where every point along the face has positive draft.

Unless otherwise indicated, the phrase "negative face" or "negative draft face" or the like refers to a face where every point along the face has negative draft.

Unless otherwise indicated, the phrase "straddle face" refers to a face that has one or more points with positive draft and one or more points with negative draft.

Unless otherwise indicated, the phrase "vertical face" refers to a face that is parallel to the pull direction (within a tolerance angle that may be user-specified) across its entirety.

Unless otherwise indicated, the phrase "feature" refers to an individual shape that, combined with other features, makes up a part or assembly.

Unless otherwise indicated, the phrase "edge" refers to a single outside boundary of a feature or a face.

Unless otherwise indicated, the phrase "boundary edge" refers to an edge that serves as a boundary between two different faces or features.

Prior Technologies

Some prior technologies exist to facilitate parting line detection. The systems and techniques disclosed in present application differ from those prior technologies in approach, context, output, etc.

For example, the desktop version of the Solidworks® computer program, available from Dassault Systèmes SolidWorks Corporation, the applicant of the current application, has some functionalities that relate to parting lines. However, the systems and techniques disclosed herein have proven far more reliable and robust and have produced correct results with a high degree of frequency. Also, in certain implementations, the systems and techniques disclosed herein can identify parting lines on internal openings on parts, which is another differentiator.

The systems and techniques disclosed herein also are superior to functionalities provided with the CATIA® computer program, also available from Dassault Systèmes SE, the parent company of the current application. Moreover, the systems and techniques disclosed herein provide additional functionalities not contemplated in the CATIA® computer program, such as on-the-fly splitting of silhouette faces, etc.

Other technical differences exist between various prior technologies and the systems and techniques disclosed herein.

Technical Disclosure

When developing a three-dimensional (3D) computer-aided design (CAD) model of a part to be molded, it can be useful to think about where the parting line in the mold will be located. This parting line is where the two main mold pieces (core and cavity) will come together (to form an internal mold cavity) and separate (allowing the molded part to be extracted from the internal mold cavity). In order to create a CAD model of the mold, mold designers generally create a series of features, all relying on the parting line. On certain simple parts, the location of the parting line may be relatively obvious (e.g., right down the middle of the molded part). However, for more complex parts, determining an appropriate location for the parting line location can be quite complex and time-consuming.

There are many considerations that can be relevant to determining an appropriate location for a parting line. For example, the location of the parting line generally determines or relates to the pull direction for the mold (e.g., the direction in which the cavity, for example, will need to be pulled relative to the core in order to separate the cavity from the core so as to open the mold). Typically, the pull direction influences how various features of the part should be drafted (e.g., angled) to ensure that the molded part will be easy to eject from the mold. Thus, the location of the parting line can impact the design of the part to be molded, as well as the complexity and corresponding cost of the mold and the molding process, including any secondary operations that may be needed to complete manufacturing of the part. Of course, the parting line must form a closed loop around the part being molded and, for complex parts especially, it can be difficult on a CAD-based platform to ensure that it does. Some faces on a part may be straddle faces (e.g., faces that have both positive and negative draft) and, on those faces, it can be difficult to know where best to locate the parting line. The parting line location can also impact the visual appearance of the finished product, leaving a sometimes-faint, but typically visible and undeniable line defect on the part where the core and cavity came together (i.e., at the parting line) during the molding process. This line appears due, in part, to the material properties of the plastic being molded. Thus, in some implementations, it may be desirable to locate the parting line along an edge of the part or at some other hidden or less conspicuous location on the part.

FIG. 1 is a schematic representation of an exemplary computer-based system 100 that facilitates collaborative design processes for parts and/or molds for the parts. Moreover, the computer-system 100 is particularly configured to facilitate and automatically propose certain parting line segments or entire parting lines for a mold for molding the parts being designed and to provide other functionalities disclosed herein that may help a user define an appropriate parting line for whatever part may be at issue. In a typical implementation, the computer system 100 performs these, and other functionalities quickly, efficiently and in a highly user-friendly manner.

The computer system 100 has a processor 102 (e.g., a CPU), computer-based memory 104, computer-based storage 106, a network interface 108, an input/output device interface 110, and a bus that serves as an interconnect between the components of the computer system 100. In a typical implementation, the bus acts as a communications medium over which the various components of the computer system 100 can communicate and interact with one another.

The central processing unit (CPU) 102 is configured to perform various computer-based functionalities disclosed herein, including other supporting functionalities not explicitly disclosed herein. Some such functionalities include enabling users to design parts and/or molds for parts, identifying parting line locations for the parts, and other related functionalities. Typically, the CPU 102 performs these functionalities by executing computer-readable instructions that may be stored in a non-transient computer-readable medium, such as the system's computer-based memory 104 or computer-based storage 106. In some implementation, the functionalities may be based, at least in part, on one or more computer-readable data/instructions received from an external source (e.g., a I/O device via the I/O device interface 110 and/or the network interface 108).

The system 100 has volatile and non-volatile computer-based storage capabilities. More specifically, the system's computer-based memory 104 provides a form of volatile storage for computer-readable instructions that, when executed by the CPU 102, cause the CPU 102 to perform at least some of the computer-based functionalities disclosed herein explicitly or otherwise. Computer-based storage 106 provides a form of non-volatile storage for software instructions, such as instructions to implement an operating system, as well as embodiment configurations information, etc.

The network interface 108 is a system component that enables connecting to any one or more of a variety of computer-based communications networks, including, for example, local area networks (LANs), wide area networks (WANs) such as the Internet, or the like.

The input/output device interface 110 is a system component that provides a connection interface for one or more input and/or output devices such as a keyboard, mouse, display, microphone, speakers, printers, etc.

In various implementations, the computer system 100 may have additional elements, such as controllers, buffers (caches), drivers, repeaters, and receivers, to facilitate communications and/or other computer-based functionalities. Furthermore, the interfaces (e.g., 108, 110) may include address, control, and/or data connections to facilitate communication among the illustrated components.

In a typical implementation, the system 100 may be loaded with and configured to run software for use in computer-aided design, computer-aided engineering, computer-aided manufacturing, and/or visualization (referred to herein generically as a "design program"), an example of which is the SolidWorks® computer program, available from Dassault Systèmes SolidWorks Corporation, the applicant of the current application. In such implementations, the parting line identification functionalities disclosed herein may be offered as a stand-alone feature or may be integrated into and/or offered together with the design program. In a typical implementation, the software associated with the parting line identification functionalities, alone or with a corresponding design program, may be provided as a set of computer-readable instructions stored in the computer-based memory 104 (or computer-based storage 106), with some of those instructions being stored externally, as an option. The processor 102 executes the computer-readable instructions to perform one or more of the various functionalities associated with the parting line identification techniques disclosed herein, alone or in conjunction with other design software functionalities. The I/O device interface 110 are connected to one or more I/O devices (e.g., a computer screen, keyboard, mouse, printer, etc. or to a touch screen device, etc.). The I/O devices are generally configured to enable a human user to interact with the system 100 to access and utilize the functionalities, particularly those related to the design software and/or parting line identification functionalities, disclosed herein.

In an exemplary implementation, the computer system 100 may configured so as to display (e.g., on a computer-based display device connected to the I/O device interface 110), a visual representation of an interface to a product design environment, such as the one provided by and within the SolidWorks® computer program. The interface and its visual representation on the computer-based display device may, in a typical implementation, provide the user with access to the parting line identification functionalities disclosed herein. Also, in a typical implementation, the computer system 100 may be able to display (e.g., on a display device coupled to the I/O device interface 110) a visual representation of an interface that solicits or enables entry of user-specified design parameters, and visually displays any data associated with the design being created and/or relevant to the parting line identification functionalities disclosed herein. The network interface 108 may be connected, via a network, to other system components (e.g., other systems, computer components, servers, etc.) to enable resource and/or data sharing, collaboration, accessing of externally-stored software and/or additional processing functionalities, etc.

In various implementations, the components in system 100 may be contained in one physical device (e.g., a laptop or desktop computer). In various implementations, the components in system 100 may be distributed across more than one physical device (e.g., multiple laptops and/or desktop computers, one or more servers, etc.). For example, the processor 102 may represent a single processor in a single physical device (e.g., a laptop or desktop computer, or a server) or may represent a plurality of processors distributed across multiple physical devices (e.g., one or more laptop computers and/or one or more network servers) working collectively to provide the functionalities disclosed herein. As another example, the memory 104 and/or the storage 106 may be contained within a single physical device (e.g., a laptop or desktop computer or a server), or may be distributed across multiple physical devices connected together via a network. In network configurations where the components of the system are distributed across multiple physical devices (e.g., one or more laptop computers and/or one or more network servers) connected via the network, each discrete physical device may include a network interface 108, one or more I/O device interfaces 110 and/or any one or more of a variety of other computer system components. A wide variety of possibilities regarding specific physical implementations are possible.

Figure 2:
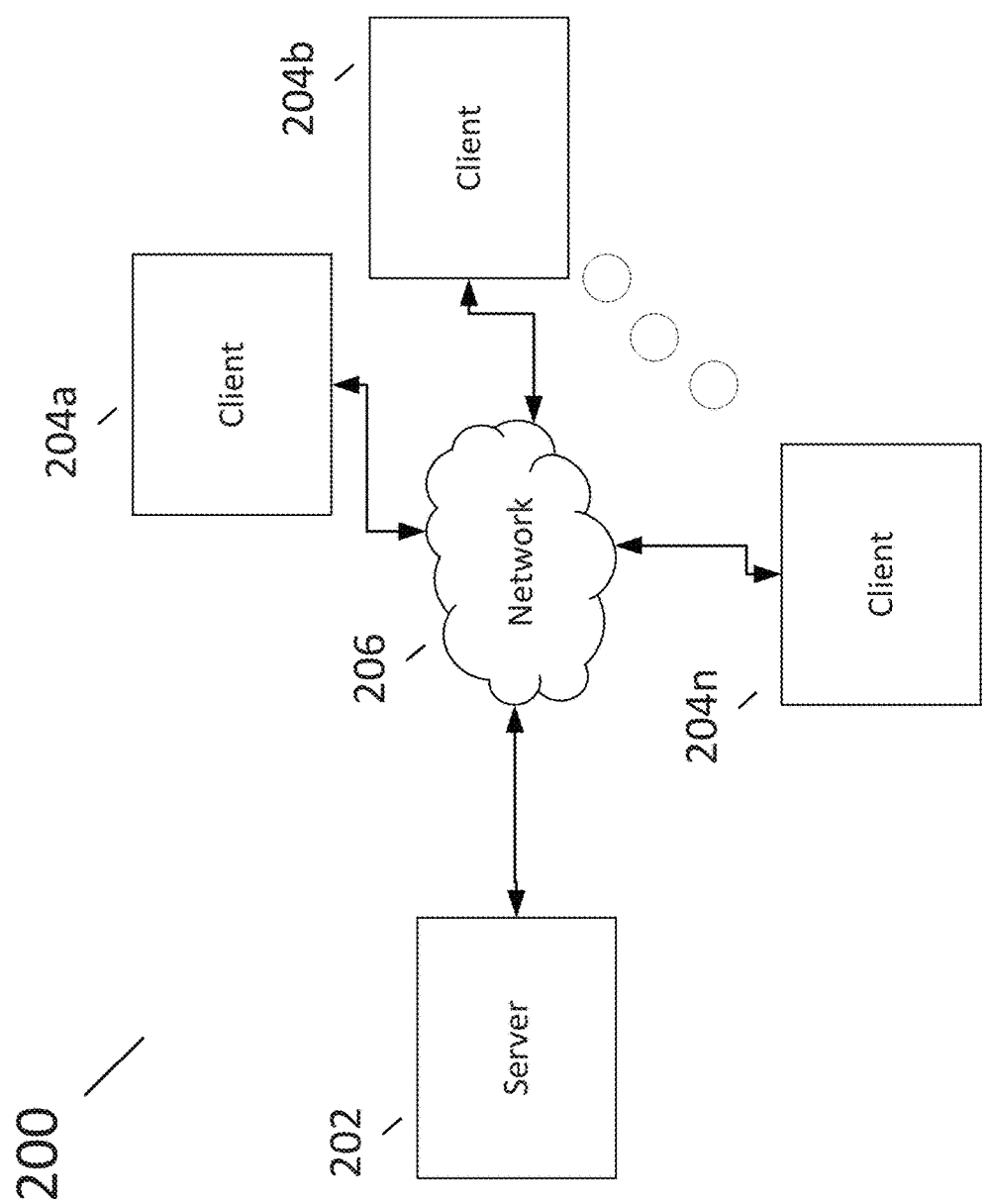
FIG. 2 is a schematic representation of an exemplary computer network environment that may be used to implement functionalities disclosed herein including parting line identification functionalities.

FIG. 2 is a schematic representation of an exemplary computer network environment 200 that may be used to implement the functionalities disclosed herein including, for example, the parting line identification functionalities.

The illustrated computer network environment 200 has a server 202, and several client devices 204a, 204b, . . . 204n (or "clients") coupled to one another via a communications network 206 that enables the server 202 and clients 204a, 204b, . . . 204n to communicate and interact with one another. In various implementations, one or more (or every single one) of the clients 204a, 204b, . . . 204n, and the server 202 may have the same types of components as those shown in the computer system 100 of FIG. 1. In some implementations, each client 204a, 204b, . . . 204n may be configured to perform one or more of the functionalities associated with parting line identification disclosed herein without requiring involvement of the server 202. In some implementations, the functionalities disclosed herein associated with parting line identification may be distributed between the server 202 and the clients 204a, 204b . . . 204n. In some implementations, a significant portion (or all) of the functionalities disclosed herein associated with parting line identification are performed by the server 202.

Various implementations may include one or more servers 202. In implementations that include more than one servers, the servers 202 may collaborate with one another and/or one or more of the clients 204a, 204b . . . 204n to provide or perform the functionalities disclosed herein associated with the tracking and management of iterations and branching in product design processes.

Figure 3:
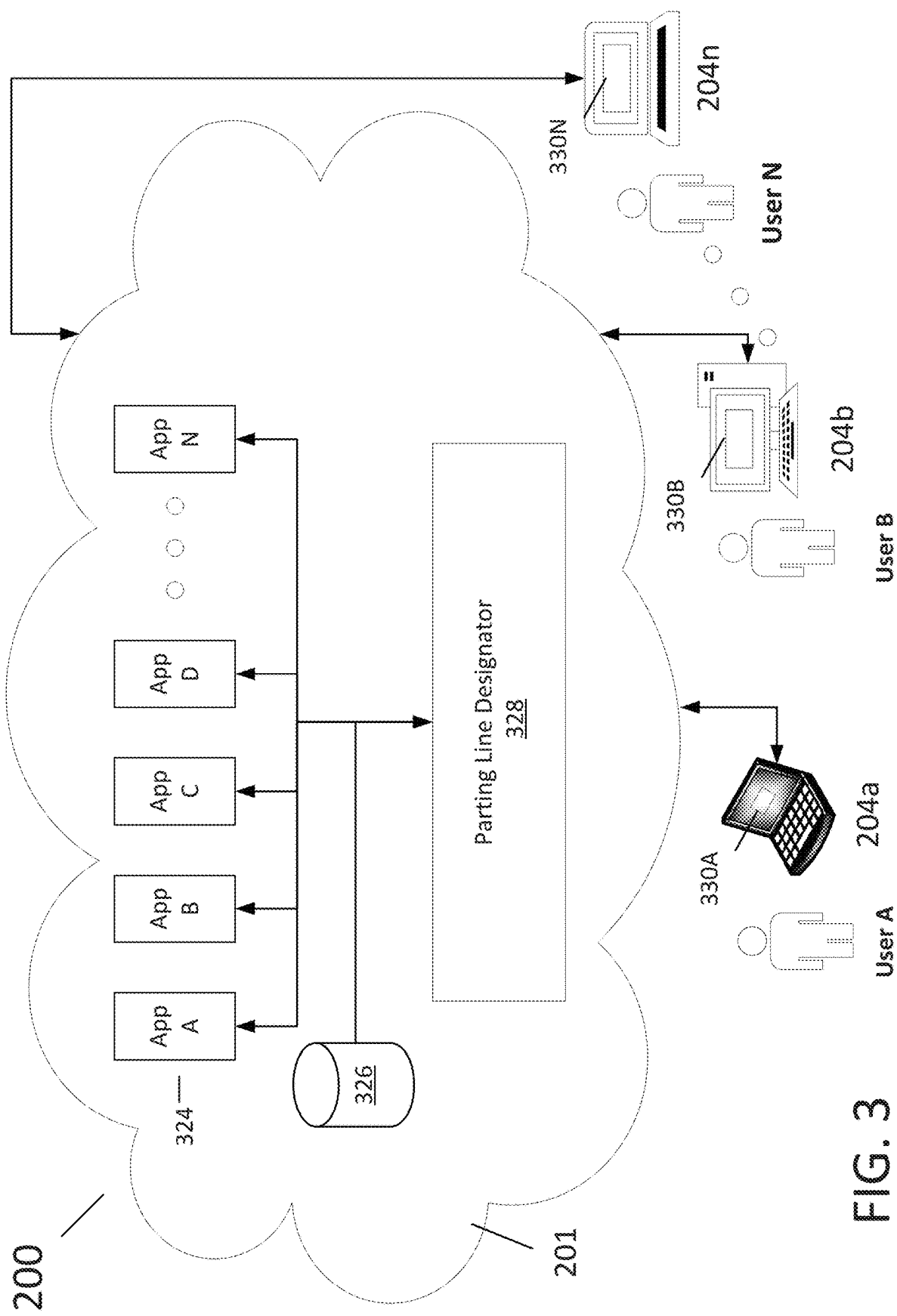
FIG. 3 is a schematic representation showing a detailed implementation of the network environment represented in FIG. 2.

FIG. 3 is a schematic representation showing a detailed implementation of the network environment 200 represented in FIG. 2.

The network environment 200 in FIG. 3 has a cloud-based collaborative product design and development platform 201 that can be accessed and utilized by a plurality of users (User A, User B . . . User N) from a plurality of computer-based user workstations 204a. 204b . . . 204n. The workstations provide a virtual environment within which users can work individually or collaboratively on the design of one or more real-world parts or assemblies (e.g., helmets, drills, automobiles, airplanes, skateboards, etc.) made up of different parts. For example, users at the various workstations can work collaboratively on the design of a skateboard assembly made up of a board and an axle assembly with an axle, wheels and a brake assembly.

Some of the parts designed may be molded parts (i.e., parts that, in order to be manufactured, will require molding). In those instances, during the design process, the designer or designers should consider moldability of the part being designed. This should include, typically, identifying an appropriate parting line location for the part. In general, the parting line for the part should be located to at least avoid undue difficulty in removing the part from the mold cavity. The parting line location can influence/be influenced by the various contours of the molded part being designed. Moreover, the parting line location can influence the design of the mold (core and cavity) to manufacture the molded part.

The computer system 100 in FIG. 1 and the network environment 200 in FIGS. 2 and 3 are particularly well-suited to facilitate identifying an appropriate parting line location for any molded parts during the design process.

Referring again to FIG. 3, the product design and development platform 201 in the illustrated network environment

200 has a plurality of software applications (App A, App B, App C, App D . . . App N) 324, a database 326 (e.g., in 104 or 106) storing data relating to the software applications, and a computer-based parting line generator 328. The computer-based parting line designator 328 in the illustrated implementation is shown as being a separate component from any of the illustrated applications 324. However, in some implementations, the parting line designator 328 may be incorporated into one or more of the applications 324 directly. Regardless of where and how the parting line designator 328 is deployed, one or more of the applications 324 may be configured to access and leverage its functionalities. The network environment 200 is configured to present user-specific virtual workspaces (referred to as "sandboxes" 330*a*, 330*b* . . . 330*n*) at each of the user workstations 204*a*, 204*b* . . . 204*n*. Each sandbox 330*a*, 330*b* . . . 330*n* includes a visual appearance on the workstation screens that include at least a viewing/editing area where a user can view and/or edit a design, and a variety of user-selectable graphical control elements, etc. that when selected and/or interacted with give the user access to any one of a variety of computer-based viewing and editing tools.

The product design and development platform 201 can take on any one of a variety of configurations. In one exemplary implementation, the product design and development platform 201 is based on the 3DEXPERIENCE® computer software platform, available from Dassault Systémes, the applicant of the current application. In essence, the 3DEXPERIENCE® platform provides a collaborative environment that empowers businesses to innovate in a highly-effective and efficient manner. It provides organizations a holistic, real-time view of their business activity and ecosystem, connecting people, ideas, data, and solutions together in a single environment.

The applications 324 can include any one of a variety of different computer software applications. Some examples include applications that enable users, individually or collaboratively, to design parts or assemblies and/or molds to manufacture the parts or assemblies. Examples of such applications that may be deployed on Dassault's 3DEXPERIENCE® platform include Solidworks® computer software for use in computer-aided design, computer-aided engineering, computer-aided manufacturing, and visualization, as well as xMold™ computer software for designing mold bodies and that includes automatic and manual tools to design/create mold core, cavity and inserts geometry. In some implementations, the parting line designator may be deployed, for example, as part of the xMold™ computer software.

The database 326, in a typical implementation, may be or include any one of a variety of computer-based database platforms. In general terms, a database is an organized collection of data (in this case, the data would be related to product/mold design and development and parting line identification) stored electronically (e.g., in 104 or 106 of FIG. 1) and accessible from a computer (e.g., 204*a*, 204*b* . . . 204*n*) typically through a database management system. In a typical implementation, the data stored in the database 326 is immutable and accessible (but not changeable) by all authorized users of the system (e.g., from any of the user interface devices 204*a*, 204*b* . . . 204*n*). One specific example of database 326 is the Microsoft SQL Server, which a relational database system that stores and that is able to retrieve data as requested (e.g., by users or by other software applications (e.g., 324)) and that includes a relational database management system, developed by Microsoft Corporation. Other database platforms are possible. In a typical implementation, the stored data relates to product designs being developed by users (User A, User B . . . User N), alone or, more likely, collaboratively, using any of the indicated applications 324. In various implementations, a SQL query engine, for example, may interpret user requests as SQL commands and language to access data stored in a relational database system. A few examples of such query engines may include Presto, Apache Drill, Cloudera Impala, and Apache Spark.

The sandboxes 330*a*, 330*b* . . . 330*n* are virtual workspaces that are deployed on the user workstations 204*a*, 204*b* . . . 204*n*. In a typical implementation, each sandbox appears as a field on the screen of its associated user workstation 204*a*, 204*b* . . . 204*n* and is able to display design(s) for users to view and/or modify as desired. In a typical implementation, if/when a user (at one of the user workstations) requests to access the design of a part stored in the database 326, the network platform 201 returns a copy of the requested design to appear at that user's sandbox. The copy of the requested object that appears in the sandbox is mutable. In other words, the user is able to modify the copy of the requested design that appears in the sandbox. In some implementations, the user may utilize one or more of the system's applications to make any such modifications. Once the user has made any desired changes to the copy of the object that appears in the sandbox, that user can publish (or save) the modified object back to the database 326. When this happens, a new version of the design is saved to the database 326. The new version includes the modifications that the user made in the sandbox. Once the new version of the design is added to the database 326, that new version is no longer mutable.

The various components of the product design and development platform 201 and other portions of the network environment 200 are coupled to one another in a manner that enables them to interact with one another and to provide users with access to, among other things, the parting line identification functionalities disclosed herein.

Figure 4A:
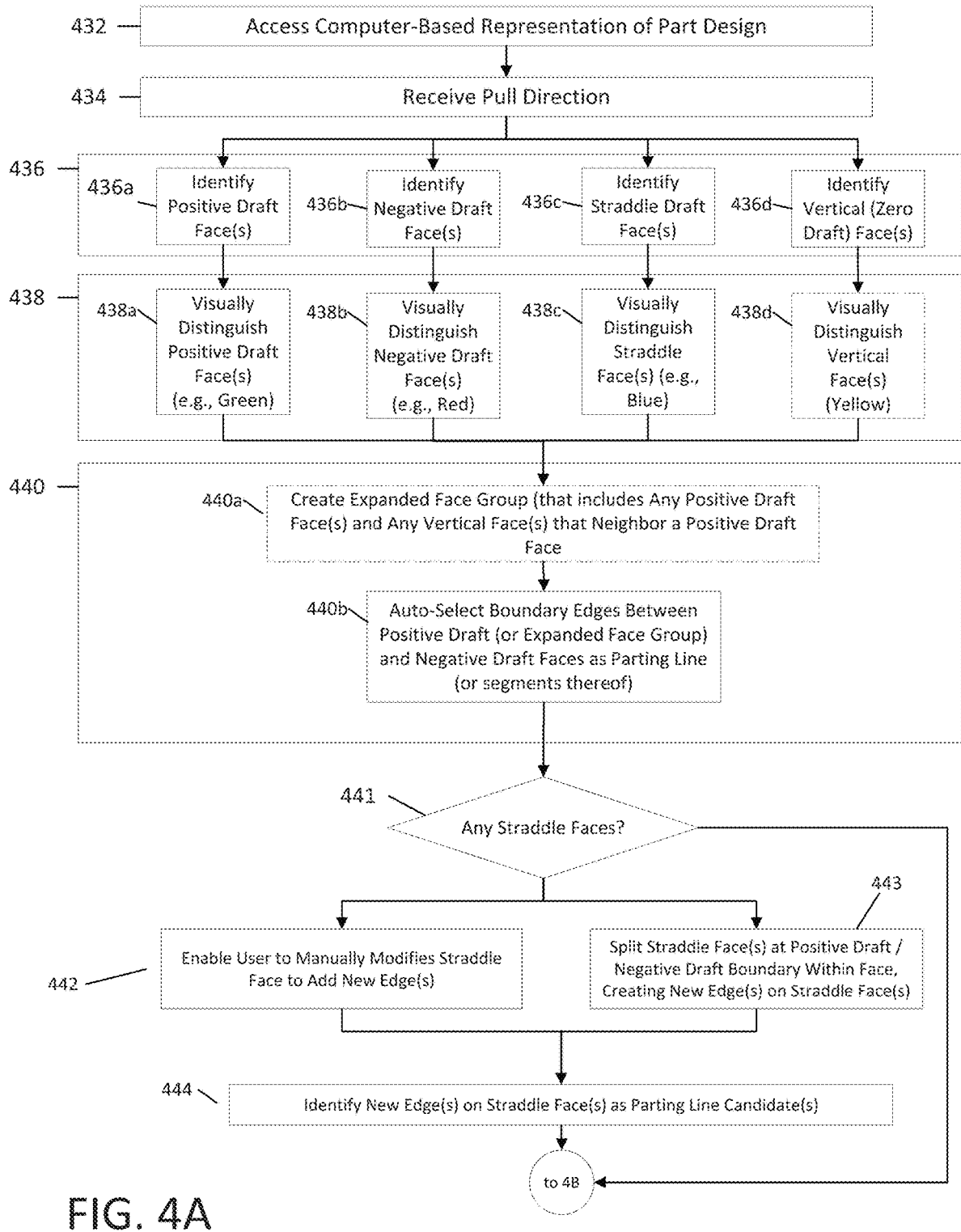
FIGS. 4A and 4B show a flowchart with an exemplary set of computer system functionalities involved in parting line identification.
Figure 4B:
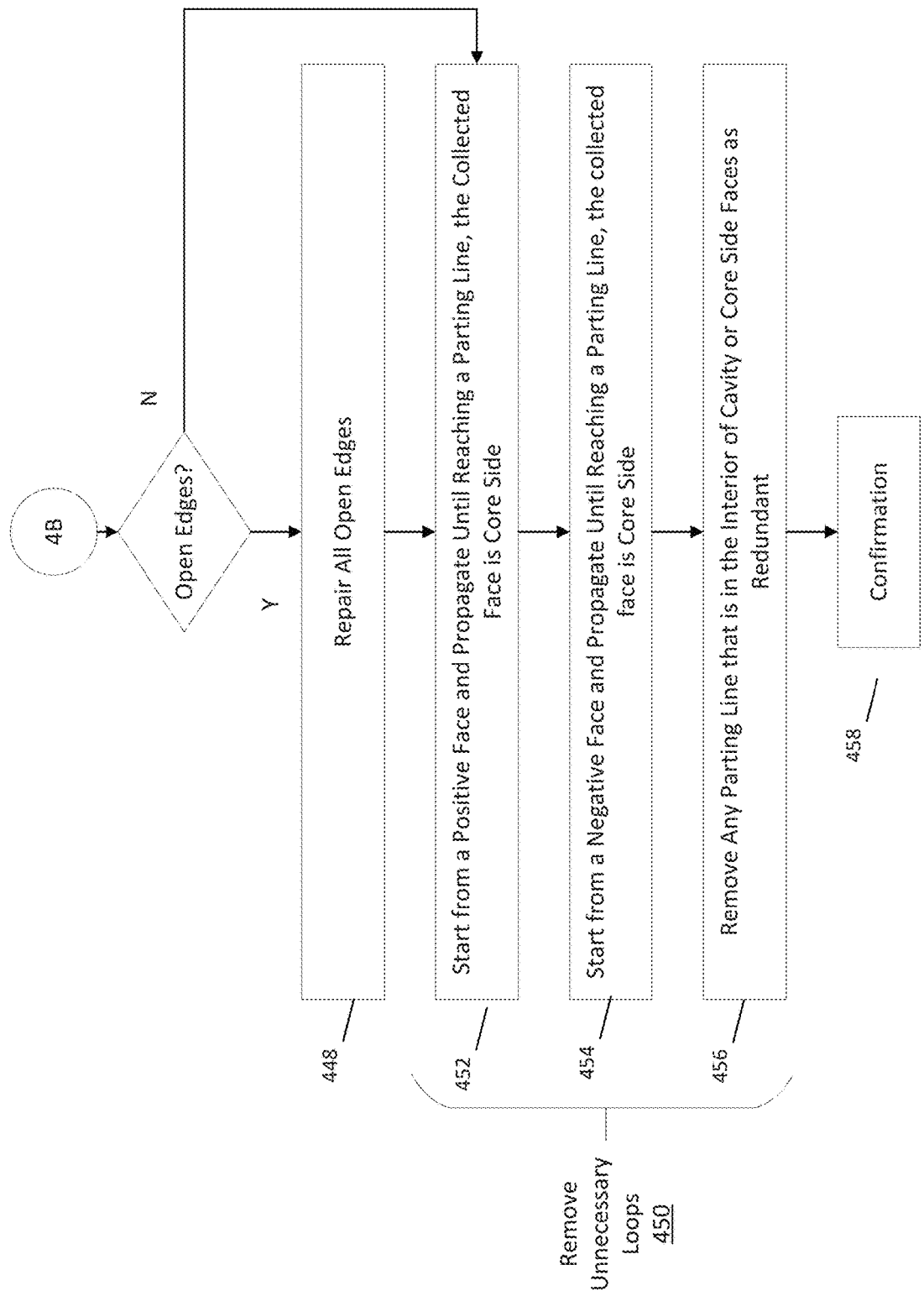

FIGS. 4A and 4B show a flowchart with an exemplary set of system actions that occur during a set of user interactions with the system (e.g., system 100 and/or network environment 200) disclosed herein involved in connection with identifying a parting line based on a virtual design for a part to be molded. FIGS. 5-13 show images of exemplary virtual part designs and screenshots from a user workstation that correspond to implementations of the steps in the process laid out in FIG. 4.

Consider that a user has modeled a part or product and wants to now create a mold for it. A user (e.g., User A at user workstation 204*a*) might select an onscreen button or the like to activate parting line identification functionalities that are reflected in FIG. 4 and that may be implemented based on software that one or more system processors are executing.

First, according to the illustrated method, the system 200 (at 432) accesses a computer-based representation of a part design, also referred to as a virtual design. The virtual design is essentially a virtual representation of a real-world part, which, for purposes of this discussion is a real-world part that will need to be molded in order to be manufactured. There are a variety of ways that the virtual representation of the part design may have come into being. For example, the design may be an in-process design that a plurality of users (e.g., User A, User B . . . User N) have worked on collaboratively over time to produce. The design may have been saved in database 326 or in any other electronic/computer-based storage medium. The system 200, in such an instance, may access the design for parting line identification purposes by calling up a copy of the design from the database 326 (or other storage medium) to one of the user workstations (e.g., 204a, 204b . . . 204n)—to appear in a corresponding user's sandboxes 330a, 330B . . . 330N, for example.

Figure 5:
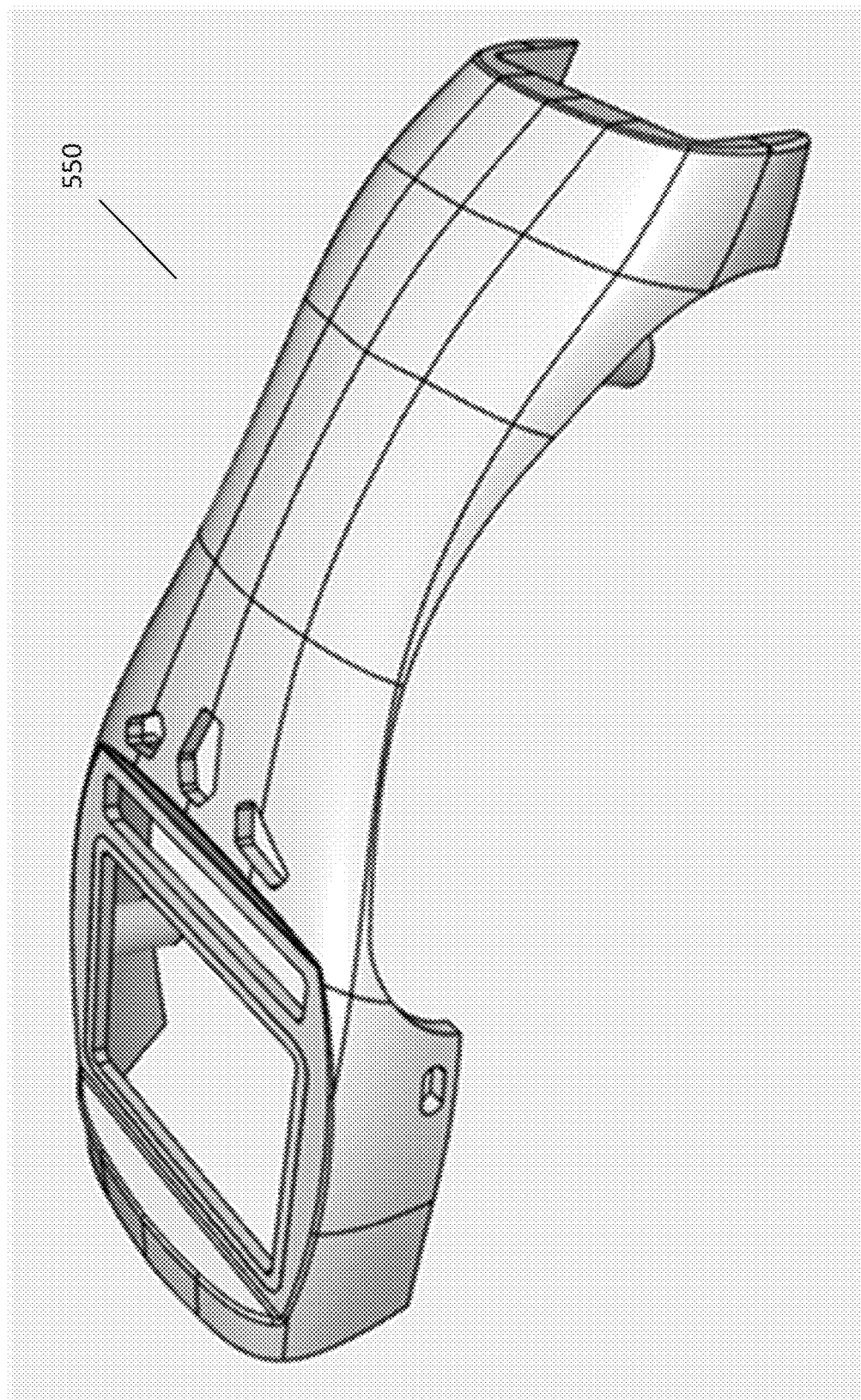
FIG. 5 shows an example of a computer-based representation of a modeled part.

FIG. 5 shows an example of a computer-based representation of a part design 550. The part represented in the illustrated computer-based representation 550, which shows how the part may appear on a computer screen within a design program interface for example, is intended to be made entirely of plastic and, therefore, is to be manufactured by molding. The part has a complex shape with a variety of contours and openings. These contours and openings, as well as the parting line for the part, will dictate the shape of the mold core, cavity, any inserts, if any.

The illustrated computer-based representation of the part design 500 has a number of faces (each identified, and surrounded, by lines that appear on the surfaces of the part). Each face represents a user-selectable area on a surface on the computer-based representation of the part to be molded and has boundaries. Regardless of pull direction, the part typically will have at least some positive face (i.e., faces where every point along the face has positive draft), at least some negative faces (i.e., faces where every point along the face has negative draft), possibly one or more straddle faces (i.e., faces where one or more points have positive draft and one or more points have negative draft), and possibly one or more vertical faces (i.e., faces that are parallel to the pull direction across its entirety). The complexities of the part's shape make it difficult to select a sensible parting line for the part—that will ensure the best combination of positive, and negative draft, etc. to ensure easy removability of the part from the mold—without access to the computer-based tools set forth herein.

Referring again to FIG. 4, the system 200 (at 434) receives data indicating a pull direction for molding the part. There are a variety of possible ways in which the system may receive this data. If a user (e.g., USER A) is using the Solidworks® computer software program (or a similar type of program), for example, that system 200 may present to the user (e.g., at user workstation 204a), a property manager (or similar sort of) functionality that is accessible by the user and that facilitates identifying a pull direction for the part to be molded. In this regard, the program may enable the user to select a point, face, or plane on the part and, in response to the user's selection, the program automatically identifies a parting direction that has a particular orientation (e.g., perpendicular) relative to the selected point, face, or plane. In some implementations, the parting direction, so selected is made to visually appear onscreen (e.g., as an arrow, alone or as one of three axes in a cartesian coordinates indicator). In some implementations, the computer program may be configured to facilitate onscreen user manipulation of the parting direction. This may be done, for example, by enabling the user to select an end of the onscreen arrow (or to select the cartesian coordinates axes) and to rotate the arrow/axes by manipulating a mouse or the like. In some instances, the system 200 may be configured to identify a default parting direction (e.g., without input from the user) and then enable the user to modify that direction as he or she sees fit. There may, of course, be other ways in which the system 200 may enable a user to identify a parting direction (at 434).

In some implementations, once a parting direction has been set/entered (e.g., by a user's entries and actions or by the system 200), the system 200 may present to the user (e.g., User A at user workstation 204A) a visual representation of the design, identifying the parting direction onscreen, as well as identifying onscreen (e.g., by color-coding) any positive faces, negative faces, straddle faces, and/or vertical faces, based on the set/entered parting direction. In those instances, if the user changes the parting direction, the system 200 may show those changes onscreen and also may change the visual appearance (e.g., color-coding) of the design onscreen to reflect any positive faces, negative faces, straddle faces, and/or vertical faces, based on the changed parting direction. Thus, depending on the orientation of the parting direction relative to the onscreen design, the system 200 presents to the user some kind of real-time indication of positive faces, negative faces, straddle faces, and/or vertical faces, which may help the user in determining a sensible pulling direction (e.g., by trying to maximize the visual appearance of positive and negative faces on the virtual representation of the design).

Figure 6:
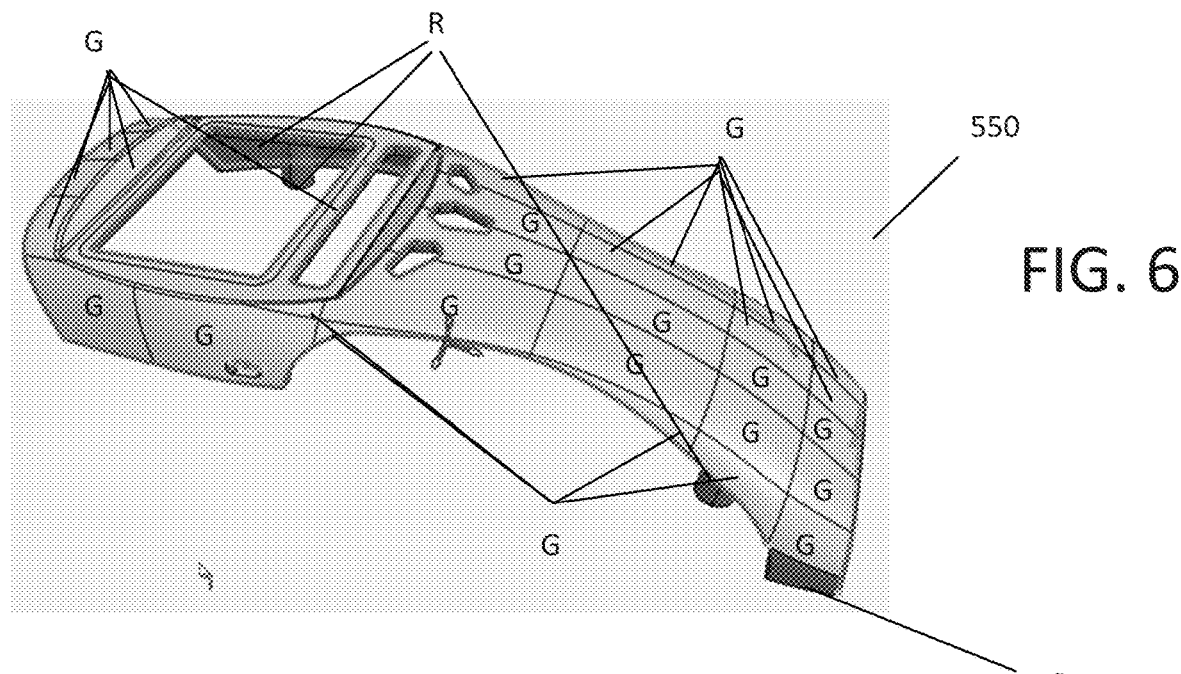
FIGS. 6 and 7 show different perspective views of the modeled part from FIG. 5, as it would appear on a screenshot, color-coded to identify faces having positive draft and negative draft, straddle faces, and/or vertical faces as identified by the computer system.
Figure 7:
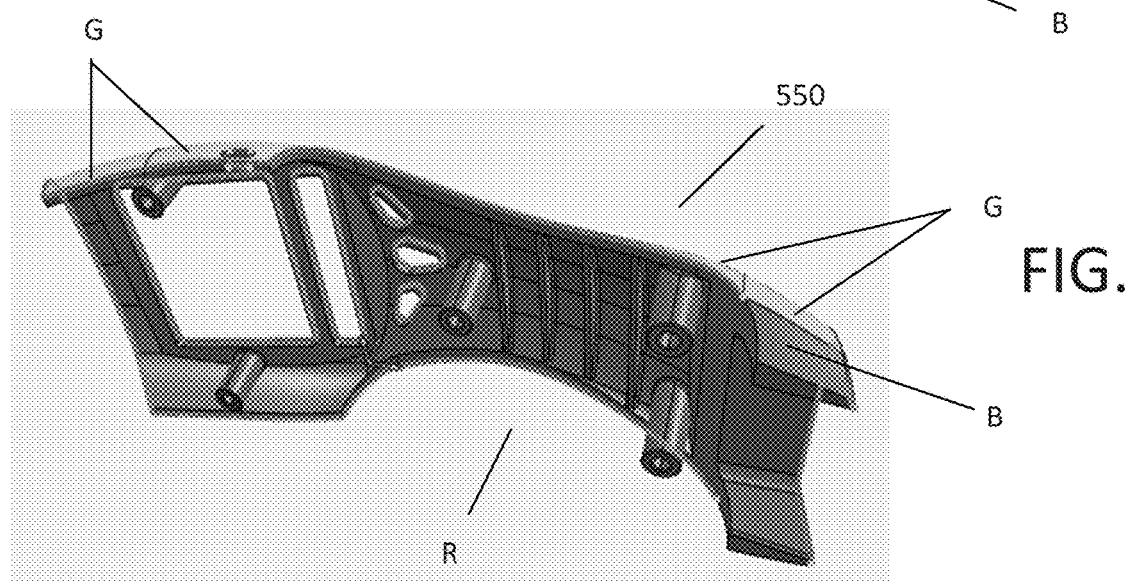

FIGS. 6 and 7 show different perspective views of the modeled part from FIG. 5 color-coded to identify any positive faces, negative faces, straddle faces, and/or vertical faces identified by the system 200. These figures have labels (G=green, R=red, and B=blue) that identify the color-coding for each face. In a typical implementation, the system 200 would present these views at a screen of a workstation without the labels, but with the color-coding only. These images also show a cartesian coordinates axes, one of which (the one pointing up) represents the user-specified pull direction.

FIG. 6 is a top, side perspective view and, therefore, shows mostly the upper surface of the part. From this perspective, most of the visible faces are color-coded green, which indicates to the viewer that most of the visible faces have positive draft only (relative to the user-specified pull direction). One face is color-coded blue to indicate to the viewer that the face is vertical to the user-specified pull direction. Only a few faces (e.g., those on the underside of the piece, but nevertheless visible from the perspective in FIG. 6) are color-coded in red, which indicates to the viewer that those faces have negative draft only (relative to the user-specified pull direction).

FIG. 7 is a bottom, side perspective view and, therefore, shows mostly the lower surface of the part. From this perspective, most of the visible faces are color-coded red, which indicates to the viewer that most of the visible faces have negative draft only (relative to the user-specified pull direction). One face is color-coded blue to indicate to the viewer that the face is vertical to the user-specified pull direction. Only a few faces (e.g., those on the upper side of the piece, but nevertheless visible from the perspective in FIG. 7) are color-coded in green, which indicates to the viewer that those faces have positive draft only (relative to the user-specified pull direction).

Next in the illustrated flowchart, the system 200 characterizes the faces in the design based on draft (at 436), and visually tags each face according to its characterization (at 438). As indicated previously, these steps may occur as the parting direction is set/entered into the system 200, or immediately thereafter so as to appear to be happening in real-time (without noticeable deliberate delay) to the user.

In a typical implementation of step 436, the system 200 characterizes each face based on whether that face has only positive draft (436a), only negative draft (436b), is a straddle face (436c) with both positive and negative draft or is a vertical face (436d) that is oriented parallel to the pull direction (436d). The characterizations in this regard are made with respect to the pull direction received at step 434.

For example, in one implementation, for each face of the modeled part or object, the system 200 identifies a plurality of points on the face to form a tessellated representation of the face. The number, density, distribution, and uniformity of points on a particular face may vary depending on size and/or complexity of the face, as well as the user's desire for granularity. In some implementations, the system 200 may be preconfigured with a set of fixed tessellation characteristics for certain faces or may be configured to determine appropriate tessellation characteristics based on one or more characteristics of the associated face. In some implementations, the system 200 may prompt or enable a user to optionally enter information that dictates or influences tessellation characteristics.

Then, for each point in the tessellated representation (or for at least one point per face), the system 200 calculates a draft angle. This draft angle calculation may be performed by the system 200 identifying a direction normal to the surface of the face at the corresponding point and then calculating the angle (i.e., the draft angle) between the normal direction and the pull direction.

If a calculated draft angle is acute (i.e., less than 90 degrees), then the system 200 concludes that the draft angle at the corresponding point is positive. If the calculated draft angle is obtuse (i.e., greater than 90 degrees), then the system 200 concludes that the draft angle at the corresponding point is negative. If the calculated draft angle is equal to 90 degrees, then the system concludes that the surface at the corresponding point is vertical (i.e., parallel to the pull direction).

Continuing this example, the system 200 then considers every draft angle calculated for each particular face. If the system 200 concludes that the draft angle at every point on a face is positive, then the system 200 concludes (at 436a) that that face is a positive draft face. If the system 200 concludes that the draft angle at every point on a face is negative, then the system 200 concludes (at 436b) that that face is a negative draft face. If the system 200 concludes that the draft angle at one or more points on a face is positive and one or more points on that face is negative, then the system 200 concludes (at 436c) that that face was a straddle face (i.e., a face with both positive and negative draft). If the system 200 concludes that the draft angle at every point on a face is equal to 90 degrees, then the system concludes (at 436d) that that face is vertical (i.e., parallel to the pull direction).

There are a variety of other ways in which the system 200 (at 436) might characterize the faces according to draft.

Next, the system 200 (at 438) visually tags each face according to its characterization. This visual tagging is typically done on the visual representation of the part design that appears on the screen of the user's workstation. The visual tags can be provided in a number of different ways. In one example, each face may be color-coded so that any positive draft faces are shown in a first color (e.g., green), any negative draft faces are shown in a second color (e.g., red), any straddle faces (if any) are shown in a third color (e.g., blue), and any vertical faces (if any) are shown in a fourth color (e.g., yellow). There are a variety of other ways to visually tag the visual representation of the part design that would convey the same or similar information to a viewer. For example, each face could be overlaid with a particular one of a plurality of different types of visual patterns (e.g., different hatch mark patterns, spotted patterns, shading, etc.), each of which indicates a particular one of the possible characterizations. In some instances, each face could be numbered or otherwise coded (with an alphanumeric or other coding) with a key provided on screen to correlate the numbering/coding to the various characterizations.

Next, the system 200 (at 440) selects a parting line location (or the location of one or more parting line segments) for the design based on the face characterizations. There are a variety of ways in which the system 200 may perform this step. According to the illustrated implementation, the system 200 (at 440a) creates a new expanded face group by combining positive draft faces with any vertical faces that neighbor that positive draft face. In some instances, the system 200 does this by selecting a positive draft face (from the group of positive draft faces already selected by the system 200) and expanding the group of positive draft faces by adding any neighboring vertical faces until the system 200 reaches a negative draft face. This results in an expanded face group that includes all of the positive draft faces and all of the vertical faces that neighbor (e.g., are adjacent to and touching) a positive draft face.

There are a variety of ways in which the system 200 may identify neighboring vertical faces and know when it reaches a negative draft face. In an exemplary implementation, the system 200, in response a parting line command starts by classifying all face types, so the system 200 will then know what are positive, negative, vertical, and straddle faces. The system 200 also tracks which faces neighbor which other faces. Starting from a (random) positive face, the system 200 conducts a search process that adds all positive neighbors and vertical neighbors into a list. The list will not include any negative faces or straddles faces, so, therefore, the face collection stops at the negative and straddles faces.

In the illustrated implementation, the faces in this new expanded face group are essentially treated as if they were all positive faces. In fact, in some implementations, the system 200 may color-code all of the faces in the resulting expanded face group as if they were all positive draft only faces (e.g., green).

Next, in the illustrated implementation, the system 200 (at 440b) automatically selects the boundary edges between the faces of the expanded face group and any negative draft face to be a parting line candidate (or segment(s) thereof). Alternatively, (especially if the system 200 does not create the expanded face group at 440a), the system 200 (at 440b) automatically selects boundary edges between any positive draft faces and negative draft faces as parting line candidates (or segments thereof).

Figure 8:
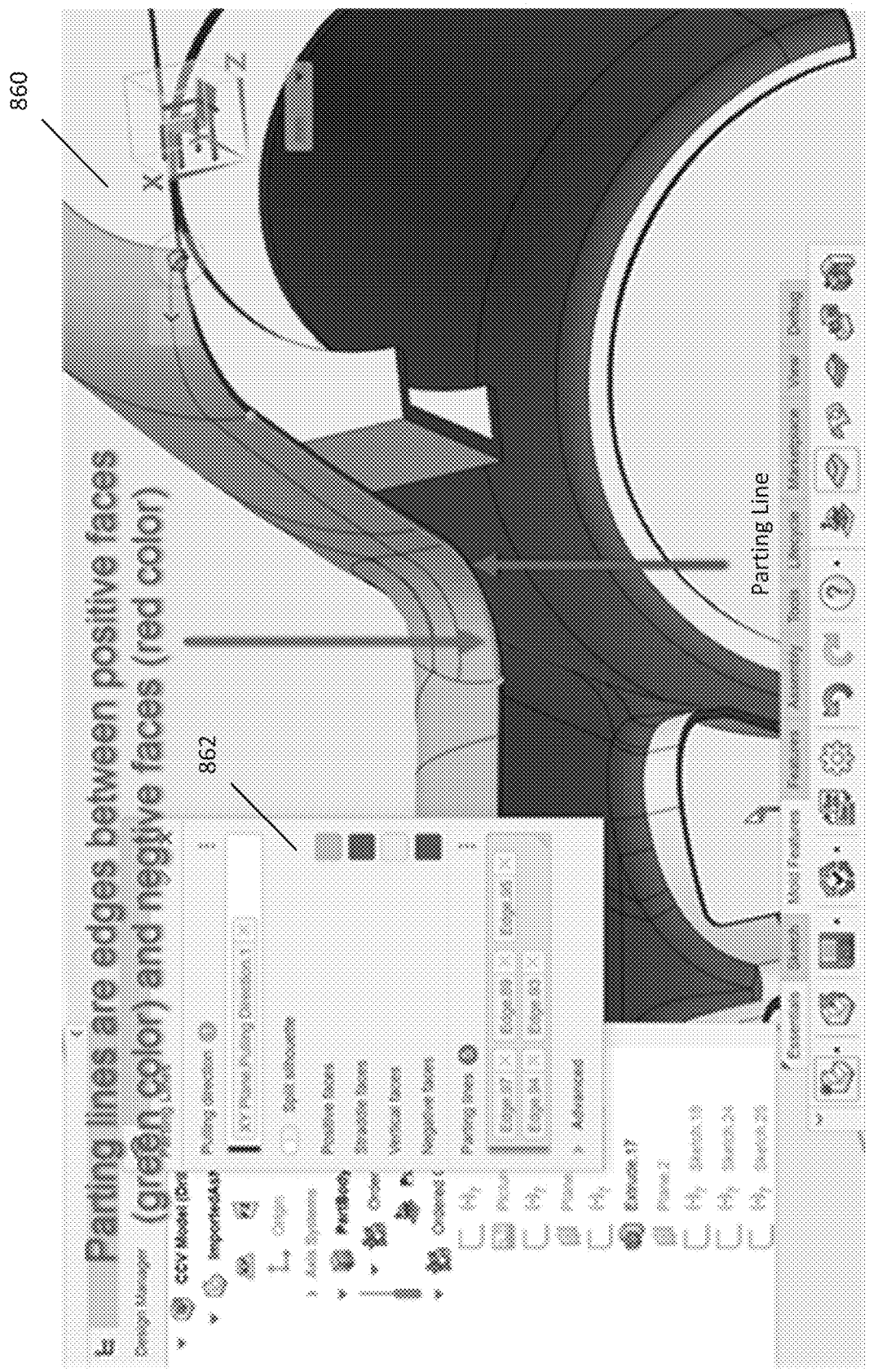
FIGS. 8-12 are exemplary screenshots from a user workstation in the system or network environment of FIGS. 1-3.

FIG. 8 is a screenshot from an exemplary implementation of system 200 which shows a partial perspective (color-coded) view of a modeled part 860 and an onscreen menu/informational box 862 with information and user-selectable buttons/sliders to access functionalities associated with parting line selection. Arrows are provided to show one exemplary parting line, which (as the label in the image indicates) is at an edge between a positive draft face (which might be color-coded green) and a negative draft face (which may be color-coded red).

The onscreen menu/informational box 862 includes a labeled box that specifies a user-specified pulling direction, which, in the illustrated example is referred to as "XY Plane Pulling Direction 1. The onscreen menu/informational box 862 also has a user-selectable "Split silhouette" button, the selection of which causes the system to automatically identify a new edge to split a straddle face (i.e., a face with positive draft and negative draft) into at least two new faces, each of which having only one or the other of positive and negative draft. The user may be given the option to approve the proposed new edge as a segment of the parting line. The onscreen menu/informational box 862 also has a key for color-coding in the image of the modeled part 860 that appears on the screen. The key identifies a different color for each of positive faces, straddle faces, vertical faces, and negative faces. The onscreen menu/informational box 862 also has a listing of edges from the modeled part—five in total in the illustrated implementation (edge 97, edge 89, edge 95, edge 94, and edge 93)—that the system 200 has identified as segments of the parting line.

Figure 9:
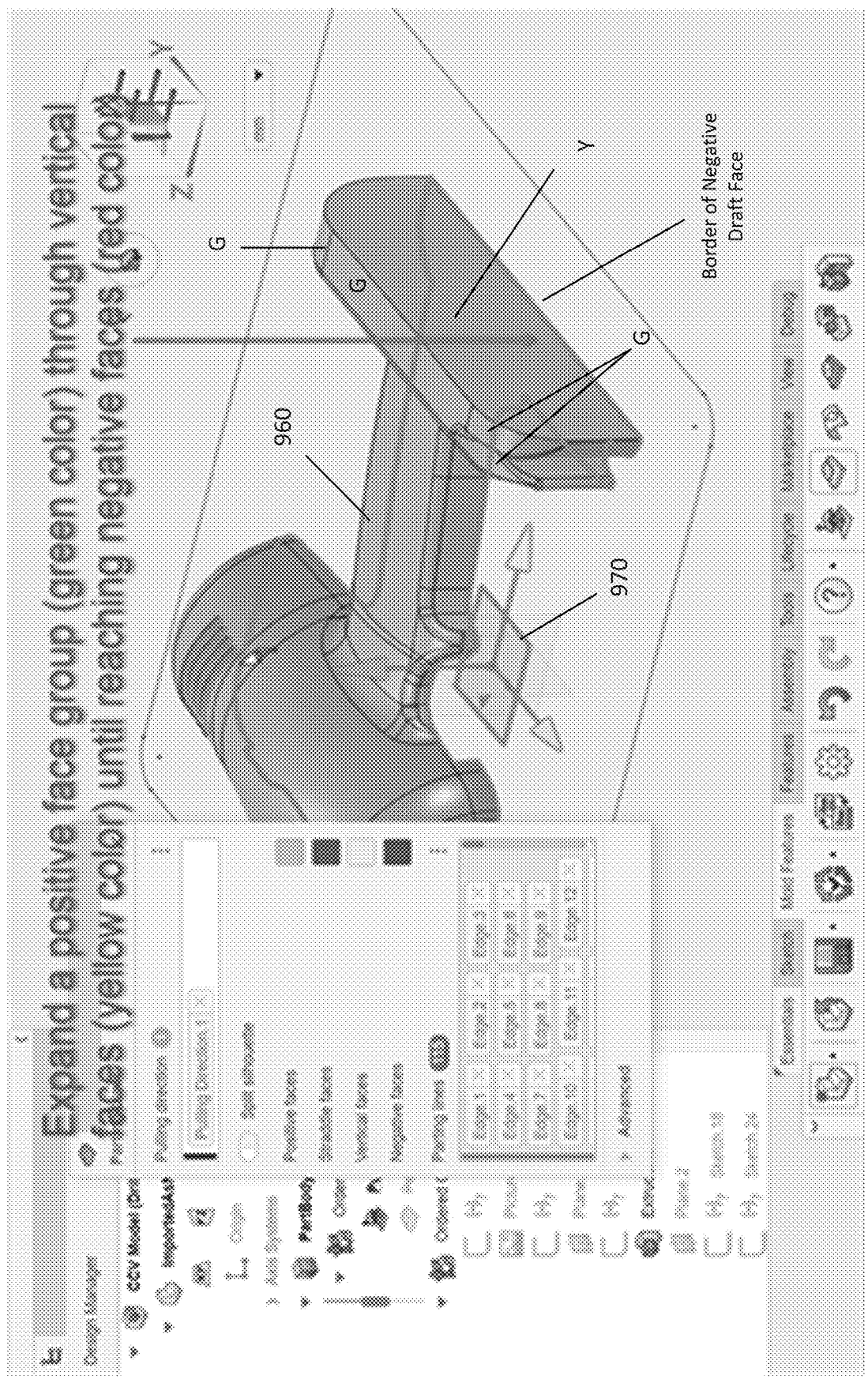
Figure 10:
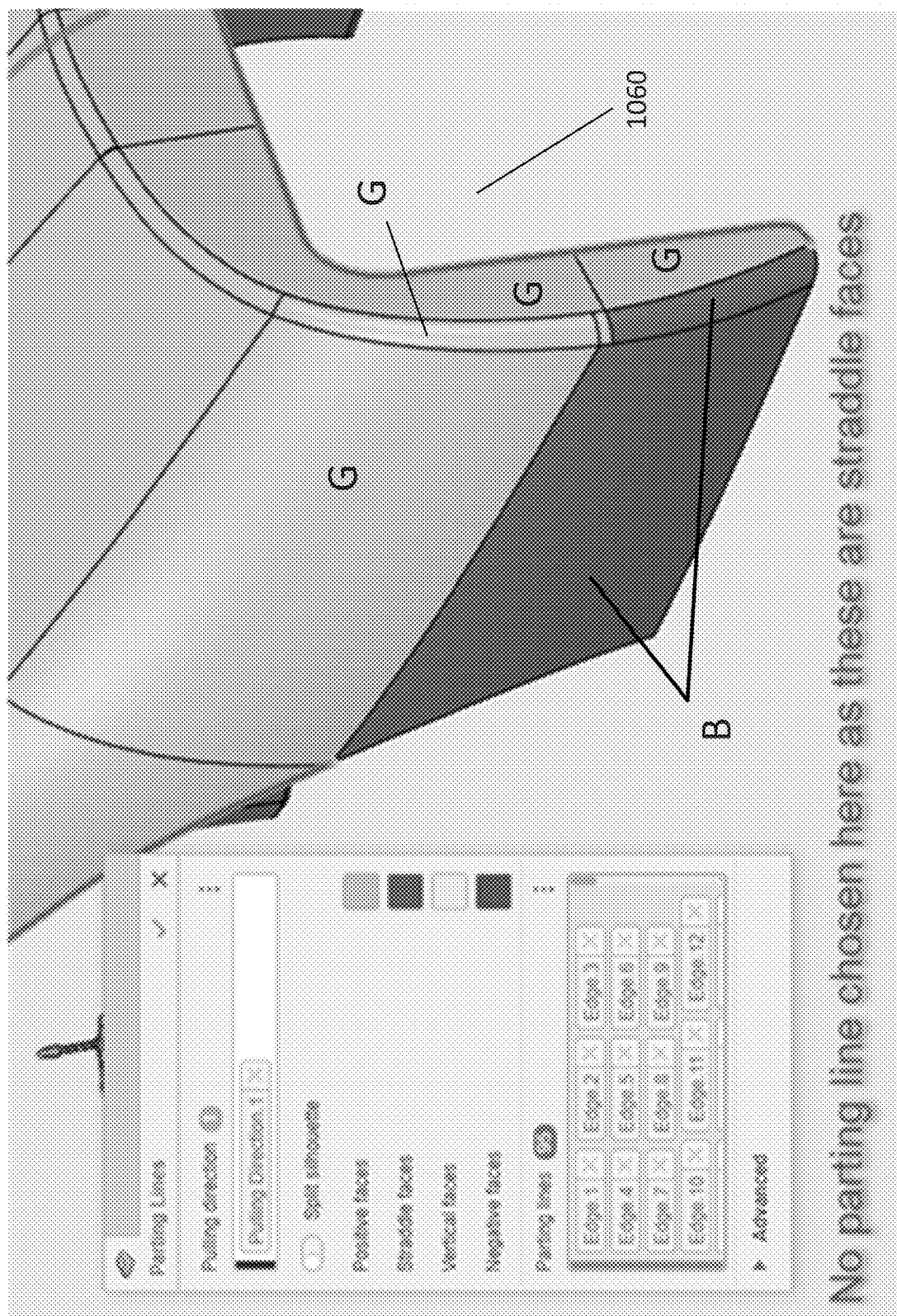
Figure 11:
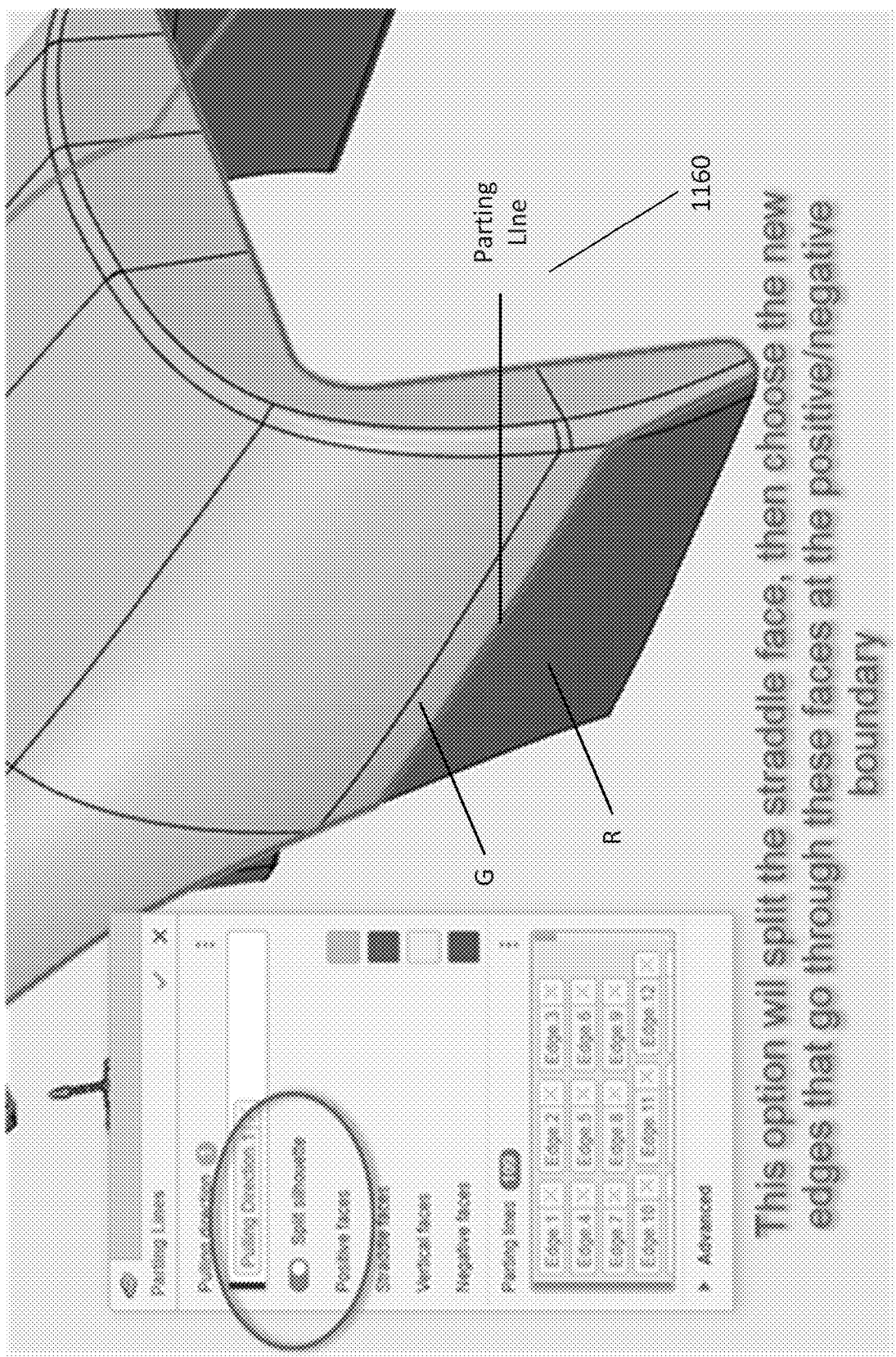
Figure 12:
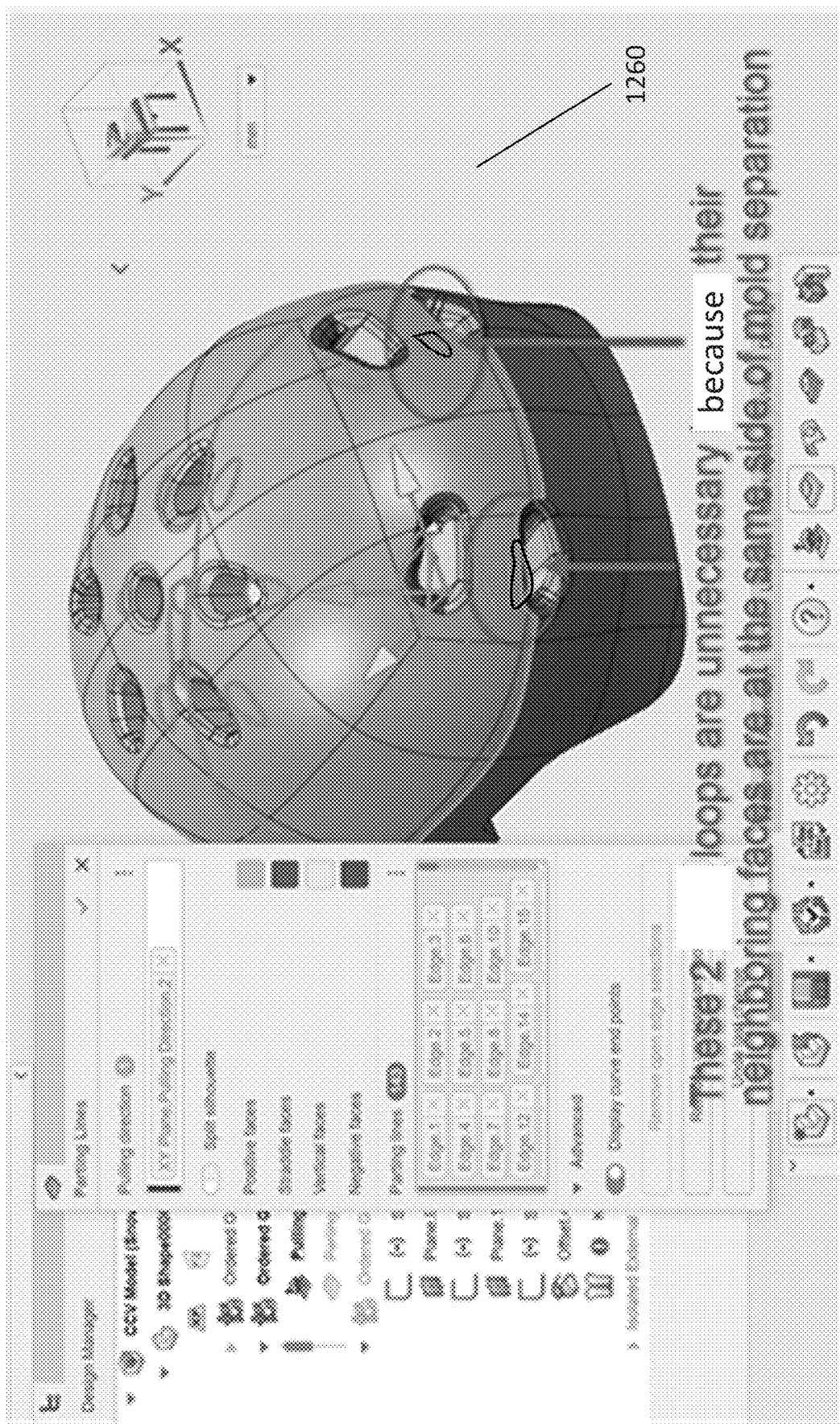

FIG. 9 is an exemplary screenshot that is similar to the screenshot of FIG. 8. The screenshot of FIG. 9, however, has a different image of a modeled part 960 than that shown in FIG. 8. The screenshot in FIG. 9 has a default (or user-selected) plane 970 with cartesian coordinate axes set superimposed on the plane 970 so that its Y and Z axes lie in the plane 970 and its X axis extends perpendicularly, in the direction indicated, from the plane 970. The X axis direction (i.e., vertically upward from the plane 970) is the user-specified pulling direction in the illustrated example.

Several faces on the image of the modeled part 960 are shown to be color-coded to reflect their respective draft characteristics. In the illustrated example, the letter "G" is used to indicate green faces, which are faces that the system 200 has determined to have only positive draft (relative to the user-specified pulling direction). Moreover, in the illustrated example, the letter "Y" is used to indicate yellow faces, which are faces that the system 200 has determined to be vertical to the pulling direction. Some of the bottom surfaces of the modeled part 960, which are not visible from the perspective shown, would be color-coded red to indicate that they are negative draft only faces. For example, in the illustrated implementation, the face(s) just beyond, and adjacent to, the faces marked "Y" (yellow) at the bottom side of the modeled part, would be color-coded red for this reason.

As the note in FIG. 9 indicates, the system 200, in a typical implementation, is configured to expand positive face groups (green color) through vertical faces (yellow color) until reaching negative faces (red color). Then, of course, parting line segments may be identified by the system 200 at the boundary edge between the expanded positive face group(s) and any neighboring negative (red color) faces.

In some instances, especially if the system-selected boundary edges form one single closed loop around the part, this may conclude the parting line identification process. In many instances, in fact, the foregoing techniques may identify most (if not all) necessary parting line edges without user interaction. In such instances, the parting line may, at that point, be set (perhaps subject to modification by the user). In some such instances, the system 200 may prompt or enable the user at that point to either accept or modify the parting line candidate before acceptance.

However, in some instances, at this point, some parts may have straddle faces and/or unnecessary loops (e.g., a loop identified at a boundary of one or more faces in the expanded face group and one or more negative faces, or a loop identified at a boundary of one or more positive faces and one or more negative faces). As shown in FIGS. 4A and 4B, the system 200, according to the illustrated implementation, may be configured to deal with such instances with steps 441-444 if/when straddle faces are present and/or with steps 446-456 if/when unnecessary loops are present.

For any straddle faces, the system 200, according to the illustrated implementation, gives the user a choice between manually modifying the design (at 442) to eliminate the straddle face from the modeled part, or automatically split the straddle face (at 443) into at least two new faces—one new face having only positive draft, the other new face having only negative draft. As noted in the screenshot of FIG. 10, however, the system 200, in some implementations, unless prompted by the user, does not automatically identify a parting line on straddle face sections of a modeled part 1060. Straddle faces in the illustrated screenshot are identified with the label "B," indicating a blue color-coding.

In some implementations, if the user (at 441) opts to manually modify the design (at 442), this may entail the user exiting the parting line identification tool and changing the design using a separate part design tool (e.g., SolidWorks® from Dassault). In such instances, the user may change the straddle face itself and optionally one or more faces adjacent to the straddle face in order to produce a modified design that no longer has the straddle face. The user may then reenter the parting line identification tool and continue the parting line identification process using the parting line identifying tool. In that case, once the user reenters the parting line identification tool, the system 200, pursuant to the processes disclosed herein, may automatically identify the former straddle face portion of the design as one new positive draft only face and one new negative draft only face with a segment of the parting line passing along the boundary between the new positive draft only face and new negative draft only face.

If, on the other hand, the user (at 441) opts to automatically split the straddle face (at 443) into at least two new faces—one new face having only positive draft, the other new face having only negative draft—the user may simply select an onscreen button or the like. An example of this is shown and highlighted as a "split silhouette" slider in the screenshot of FIG. 11. In a typical implementation, if a user selects the "split silhouette" slider in the illustrated screenshot, the system 200 automatically splits one or more straddle faces in the modeled part 1160.

There are a number of ways in which the system 200 (at 443) might split a straddle face automatically (e.g., by adding a new edge at a boundary between a first portion of the face that has only positive draft (or only positive draft and vertical draft) and a second portion of the face that has only negative draft). In some such instances, the system 200 may identify the positive draft, negative draft, and vertical portions of a selected face by implementing an approach similar to that disclosed above with reference to characterizing each face. More specifically, the system 200, in response to a user activating the "split silhouette" functionality, may identify a plurality of points on the face to form a tessellated representation of the face, then, for each point in the tessellated representation, the system 200 calculates a draft angle. The system 200 characterizes each point according to the calculated draft angle as having positive draft, negative draft, or no draft (e.g., vertical). Then, the system 200 creates a new edge with all of the positive draft points on one side of the new edge and all of the negative draft points on an opposite side of the new edge. In some implementations, the system 200 would locate the new edge so that all of the no draft (e.g., vertical) points are on the same side of new edge as the positive draft points. Once the new edge is created, the software tool (following procedures similar to those set forth above) automatically identifies a boundary between the two new faces (separated by the new edge) as being a portion of the parting line.

There are other ways, of course, that the system 200 (at 442) might enable a user to modify a design to eliminate any straddle faces, or automatically split a straddle face in response to a simple user action (e.g., a user making an onscreen selection of a button or the like).

In some instances, even after all of the foregoing steps, the parting line will not have been identified completely. Indeed, in some instances, there still may be breaks in the identified parting line (i.e., open segments or open edges), such that the parting line segments do not form closed shapes. In those instances, the system 200 may be configured to repair (or prompt the user to repair) any (and all) open edges (so that the parting line forms a closed shape and is complete around the entire part). According to the illustrated implementation, the system 200 (at 446) may determine whether there are any open edges in the identified parting line. An open edge is segment of the parting line that is not complete (i.e., the parting line does not form a closed shape and any openings in the shape are at the open edge(s)).

There are a variety of ways in which the system 200 may determine if there are any open edges in an identified parting line. For example, every edge has 2 end vertices and, in a typical implementation, the system 200 may store information identifying, for each vertex, what edges start/end at it. The system 200 may start forming a list from an edge, then finding the edge's neighbors that share the edge's start/end vertices. Those neighbors get added to the list. The process is repeated for any added neighbors, and this continues until the system 200 identifies no more unlisted edges. The system 200 then checks if the identified/listed edges form a loop. If not, the system 200 identifies edges where there are breaks as open edges.

If (at 446), there are any open edges, the system 200 may (at 448) repair those open edges (or at least prompt/enable the user to repair any open edges). If the system 200 (at 448) prompts or enables the user to repair any open edges, the system 200 may visually highlight any such openings. This may be done by a visual coding (e.g., color-coding or visual highlighting) in the visual appearance of the modeled part on the workstation screen. Other techniques for visual coding or highlighting may be implemented as well. The user, in such instances, may be able to select one or more edges of faces on the modeled object as parting line segments from his or her workstation to close any such open edges.

In a typical implementation, a parting line defines the edges where the model will be separated into core and cavity models. Therefore, parting lines should not exist between adjacent positive faces (cavity side) or between adjacent negative faces (core side). However, if a hole in the design lies entirely on the core or cavity side of the model, users will sometimes mistakenly select the edges around these holes as a parting line, despite the fact the core and cavity sides do not meet at these holes. In some implementations, the system 200 is configured to address this issue by removing (at 450) any unnecessary loops that may have been identified incorrectly as parting lines.

This process, according to the illustrated process, begins with the system 200 starting from a positive face (or a point on a positive face) and then propagating from that face or point until a parting line is reached (at 452). In a typical implementation, the propagation continues until a parting line is reached (e.g., that encloses or surrounds an entirety of the propagated area). Then, any face(s) covered by the propagated area are identified by the system 200 as portions of the part that corresponding to a cavity side of the mold. This means that those portions of the part, when molded, will be formed by and in direct physical contact with the cavity side of the mold.

There are a variety of ways in which the system 200 may determine that it has reached a parting line. In an exemplary implementation, the system 200 stores data identifying boundary edges and neighboring faces for every face. If the system 200 determines that a particular face edge belongs to the parting line edges, then the system concludes that it has reached the parting line. If the particular face edge does not belong to the parting line edges, then system 200, in the illustrated process, adds the neighboring face and continues checking the edges of a neighbor.

Next, the illustrated process has the system 200 starting from a negative face (or a point on a negative face) and then propagating from that face or point until a parting line is reached (at 454). In a typical implementation, the propagation continues until a parting line is reached that encloses or surrounds an entirety of the propagated area. Then, any face(s) covered by the propagated area are identified by the system 200 as corresponding to a core side of the mold. This means that those faces, when molded, will be formed by and in direct physical contact with the core side of the mold.

In general, propagating refers to the process of starting from a face and adding qualified neighboring faces. Then repeatedly adding more qualified neighboring faces of the neighbors. In an exemplary implementation, the system goes from the start point on a given (e.g., positive) face, then goes face by face from there, identifying them also as positive until the parting line is reached. The system 200 may know it reaches a parting line because one of the edges on a given face is already selected by the system (from a previous step in the algorithm or by the user). In some implementations, the system 200 may identify that a parting line has been created (again by the previous step or by the user) along an edge that does not divide the positive and negative portions of the part, and therefore can be removed. So, if there is a parting line that has positive faces on both sides of it (or negative on both sides), then it is not needed as that does not represent where the two main portions of the mold will separate.

Once the cavity side of mold and the core side of the mold have been so identified (at 452 and 454), the system 200 (at 456) removes any parting lines (or unnecessary loops) discovered within the boundaries of the cavity side or the core side of the mold.

Thus, for any modeled parts where a parting line has been mistakenly chosen in a place where the core does not meet the cavity, the "remove unnecessary loops" option will correct this. In the modeled part 1260 shown in FIG. 12 (a helmet), for example, the two vent holes on the bottom rear of the helmet do not need parting lines because the holes lie below the main exterior parting line going around the helmet. Therefore, these holes get created entirely by core faces. This option will recognize that and prevent the user from selecting edges around these holes.

After the system 200 removes any unnecessary loops (at 450), the system 200 then (at 458) presents the user (e.g., User A at user workstation 204a) a message confirming that the parting line identified in the design is valid for mold separation. In an exemplary implementation, a popup box may appear on a screen of the user workstation with an informational message that reads, "parting line is complete for model separation," or something similar.

Once all the selections are complete, the user clicks OK to validate, thus creating the parting line going around the model. The system 200 may then present a view of the modeled part with the parting line identified thereupon by a colored line, for example.

In a typical implementation, once a part design has been completed and the parting line identified, a user (e.g., User A at user workstation 204a) may utilize a software-based mold design tool, executing on system 200, to finish designing the mold. The mold, with the parting line, is then produced, based on the mold design. Then the mold may be used to mold a real-world, molded version of the modeled part. The parting line in the mold will have been set, by the system and techniques disclosed herein, such that the molded part will be easy to remove from the mold when the molding process has been completed.

A number of embodiments of the invention have been described. Nevertheless, it will be understood that various modifications may be made without departing from the spirit and scope of the invention.

In various implementations, certain computer components disclosed herein (e.g., applications, design tools, the parting line identifier, etc.) can be implemented by one or more computer-based processors executing computer-readable instructions stored on non-transitory computer-readable medium to perform the associated computer-based functionalities. The one or more computer-based processors can be virtually any kind of computer-based processors and can be contained in one housing or distributed at different locations, and the non-transitory computer-readable medium can be or include any one or more of a variety of different computer-based hardware memory/storage devices either contained in one housing or distributed at different locations.

Certain functionalities are described herein as being accessible or activated by a user selecting an onscreen button or the like. This should be construed broadly to include any kind of visible, user-selectable element.

The systems and techniques disclosed herein can be implemented in a number of different ways. In one exemplary implementation, the systems and techniques disclosed herein may be incorporated into the modeling functionalities of the xMold™ computer program available from Dassault Systèmes, the applicant of the current application. In various implementations, the systems and techniques can be deployed otherwise.

It should be understood that the example embodiments described herein may be implemented in many different ways. In some instances, the various methods and machines described herein may each be implemented by a physical, virtual, or hybrid general purpose computer, such as the computer system, or the computer network environment described herein. The computer system may be transformed into the machines that execute the methods described herein, for example, by loading software instructions into either memory or non-volatile storage for execution by the CPU. One of ordinary skill in the art should further understand that the system and its various components may be configured to carry out any embodiments or combination of embodiments of the present invention described herein. Further, the system may implement the various embodiments described herein utilizing any combination of hardware, software, and firmware modules operatively coupled, internally, or externally, to or incorporated into the system. Further, the system may be communicatively coupled to or be embedded within a manufacturing device and be configured so as to control the device to create a physical object as described herein.

Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to be solely a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification (e.g., aspects of those represented in FIGS. 4A and 4B, and otherwise disclosed herein) can be implemented as operations performed by a data processing apparatus (e.g., a processor/specially-programmed processor) on data stored on one or more computer-readable storage devices or received from other sources, such as the computer system and/or network environment in FIG. 1, 2, and/or 3. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Other implementations are within the scope of the claims.

What is claimed is:

1. A computer-based method of identifying a parting line for molding a real-world part based on computer-generated model of a part, the method comprising:
   receiving a computer-based representation of a modeled part;
   displaying the computer-based representation of the modeled part in a computer-aided drafting (CAD) system display device;
   receiving an indication of a parting direction for a mold to make a real-world version of the part;
   characterizing, with a computer-based processor, each respective one of a plurality of faces in the computer-based representation of the modeled part as a positive draft face or a negative draft face, wherein each positive draft face has positive draft with respect to the parting direction across its entirety, and wherein each negative draft face has negative draft with respect to the parting direction across its entirety;
   identifying a plurality of points on a face to form a tessellated representation of the face;
   calculating a draft angle for each of the plurality of points of the tessellated representation;
   based on the draft angles for each of the plurality of points, characterizing the face as one of the group of a positive draft face, a negative draft face, a straddle face, and a vertical face;
   identifying, as at least a segment of the parting line, a boundary edge between a first one of the positive draft faces and a first one of the negative draft faces that neighbors the first one of the positive draft faces;
   storing the boundary edge in the computer-generated model of the part;
   generating a mold incorporating the parting line from the computer-generated model; and
   molding a real-world part with the mold.

2. The computer-based method of claim 1, further comprising:
   characterizing, with the computer-based processor, one or more faces in the computer-based representation of the modeled part as a vertical face,
   wherein each vertical face lies in a plane that is parallel to a pull-direction.

3. The computer-based method of claim 2, further comprising:
   creating, with the computer-based processor, an expanded face group that includes every face in the computer-based representation of the modeled part that has been characterized as a positive draft face and every face in the computer-based representation of the modeled part that neighbors one of the positive draft faces and has been characterized as a vertical face.

4. The computer-based method of claim 3, further comprising:
   identifying, as at least a segment of the parting line, a boundary edge between a first one of the vertical faces in the expanded face group and second one of the negative draft faces.

5. The computer-based method of claim 1, further comprising:
   characterizing, with the computer-based processor, one or more straddle faces in the computer-based representation of the modeled part,
   wherein each straddle face is a face that has a first portion with positive draft with respect to the parting direction and a second portion with negative draft with respect to the parting direction.

6. The computer-based method of claim 5, further comprising:
   splitting a first one of the straddle faces by creating a new edge that extends across the first one of the straddle faces between the first portion of the straddle face and the second portion of the straddle face.

7. The computer-based method of claim 6, further comprising identifying, as a segment of the parting line, the new edge.

8. The computer-based method of claim 1, further comprising:
   removing one or more loops in the computer-based representation of the modeled part that have been incorrectly identified as a portion of the parting line.

9. The computer-based method of claim 8, wherein removing the one or more loops that have been incorrectly identified as a portion of the parting line comprises:
   propagating the computer-based representation of the modeled part starting from a selected one of the positive draft faces until reaching an identified parting line to identify a cavity side of the modeled part;
   propagating across the computer-based representation of the modeled part starting from a selected one of the negative draft faces until reaching an identified parting line to identify a core side of the modeled part; and
   removing any identified parting lines that fall within the cavity side of the modeled part or the core side of the modeled part.

10. The computer-based method of claim 1, further comprising:
    enabling or prompting a user at a computer-based user workstation to identify a pull-direction.

11. The computer-based method of claim 1, further comprising:
    providing a visual indication at a computer screen of a user workstation of any parting line segments, positive draft faces, negative draft faces, as well as any straddle faces, and vertical faces identified in the computer-based representation of the modeled part.

12. The computer-based method of claim 11, wherein the visual indication comprises color-coding one or more of the positive draft faces, negative draft faces, straddle faces, and/or vertical faces.

* * * * *